United States Patent
Koehne et al.

(10) Patent No.: US 6,793,693 B1
(45) Date of Patent: Sep. 21, 2004

(54) METHOD FOR UTILIZING A FUEL BY USING EXOTHERMIC PRE-REACTIONS IN THE FORM OF A COLD FLAME

(75) Inventors: Heinrich Koehne, Aachen (DE); Klaus Lucka, Aachen (DE); Ingo Rudolphi, Juelich (DE); Heinz-Peter Gitzinger, Neuss (DE); Lutz Hartmann, Gummersbach (DE)

(73) Assignee: Heinrich Köhne, Aachen (DE)

( * ) Notice: Subject to any disclaimer, the term of this patent is extended or adjusted under 35 U.S.C. 154(b) by 0 days.

(21) Appl. No.: 09/744,752

(22) PCT Filed: Jul. 29, 1999

(86) PCT No.: PCT/EP99/05429

§ 371 (c)(1),
(2), (4) Date: Mar. 23, 2001

(87) PCT Pub. No.: WO00/06948

PCT Pub. Date: Feb. 10, 2000

(30) Foreign Application Priority Data

Jul. 29, 1998 (DE) .......................................... 198 34 051
Dec. 21, 1998 (DE) .......................................... 198 60 308
Jun. 14, 1999 (DE) .......................................... 199 27 045

(51) Int. Cl.$^7$ .............................. C10L 1/00; C10L 1/18; C10L 1/12
(52) U.S. Cl. .............................. 44/300; 44/301; 44/302; 44/457; 44/458
(58) Field of Search .......................... 44/300, 301, 302, 44/457, 458

(56) References Cited

U.S. PATENT DOCUMENTS

| | | | |
|---|---|---|---|
| 4,002,151 A | | 1/1977 | Toyoda et al. |
| 4,245,979 A | * | 1/1981 | Ito .............................. 431/202 |
| 4,264,435 A | | 4/1981 | Read, Jr. et al. |
| 4,397,958 A | * | 8/1983 | Vroom ......................... 436/141 |
| 5,425,233 A | * | 6/1995 | Ma et al. ....................... 60/274 |
| 5,692,890 A | * | 12/1997 | Graville .......................... 431/9 |

FOREIGN PATENT DOCUMENTS

| | | |
|---|---|---|
| DE | 196 18 121 A1 | 11/1997 |
| FR | 2 369 914 A | 6/1978 |

* cited by examiner

Primary Examiner—Cephia D. Toomer
(74) Attorney, Agent, or Firm—Jacobson Holman PLLC

(57) ABSTRACT

A process for the utilization of a fuel having an initial boiling temperature or prevailing initial boiling temperature range at 1 bar of between 231 K and 830 K, characterized by the following features:

(a) the fuel is contacted with at least one oxidant preheated to from 520 K to 880 K at a pressure, p, of $\geq 1$ bar, or at a lower pressure with a reduction of the temperature range, and a C/O molar ratio of between 1:0.14 and 1:25 in a reaction space to initiate exothermic prereactions in the form of a cool flame which cause only partial conversion of the fuel and oxidant even when the fuel and oxidant are homogeneously mixed; and (b) a kinetic reaction inhibition of the further reaction of the oxidizable mixture formed in the cool flame is provided by adjusting a technically relevant dwelling time $t_v$ of the mixture prepared in step (a) in the reaction space of $t_v > 25$ ms at $p \leq 1$ bar, and dwelling times which become shorter when the pressure is increased under otherwise equal conditions, and a limited heat dissipation from the reaction zone through an inert gas stream with a ratio of the heat capacity flow of the oxidant, $\dot{M} \cdot c_p$, to the product of fuel mass flow, $\dot{M}_b$, and heating value, $H_u$, which is, in the adiabatic reaction space, $\dot{M} \cdot c_p / \dot{M}_b \cdot H_u > 2 \cdot 10^{-4} K^{-1}$, and/or through the reactor wall with a heat flow density, $\dot{q}$, of $\dot{q} < 85$ kW/m$^2$, whereby auto-ignition of the mixture is prevented, especially for a predictable period of time.

17 Claims, 12 Drawing Sheets

Ignition temperature as a function of carbon chain length (Zabetakis et al., 1954)

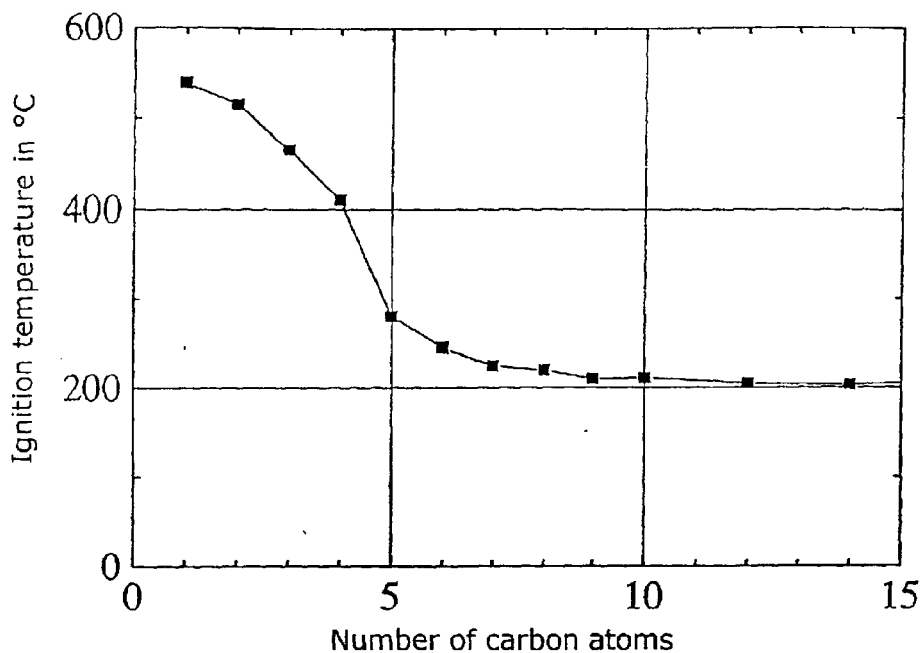
Fig. 1  Ignition temperature as a function of carbon chain length (Zabetakis et al., 1954)
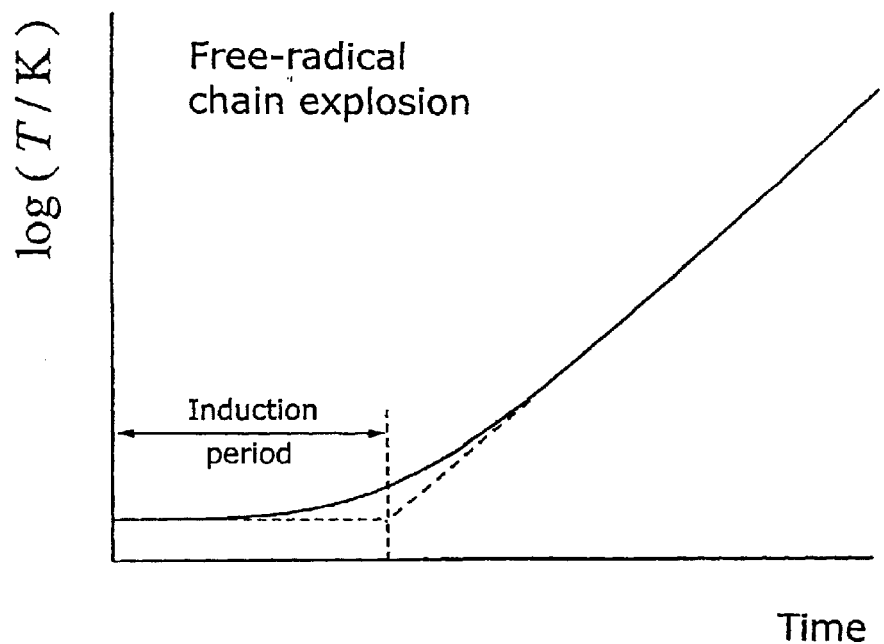
Fig. 2  Schematic course of temperature in a free-radical chain explosion (Warnatz et al., 1993)

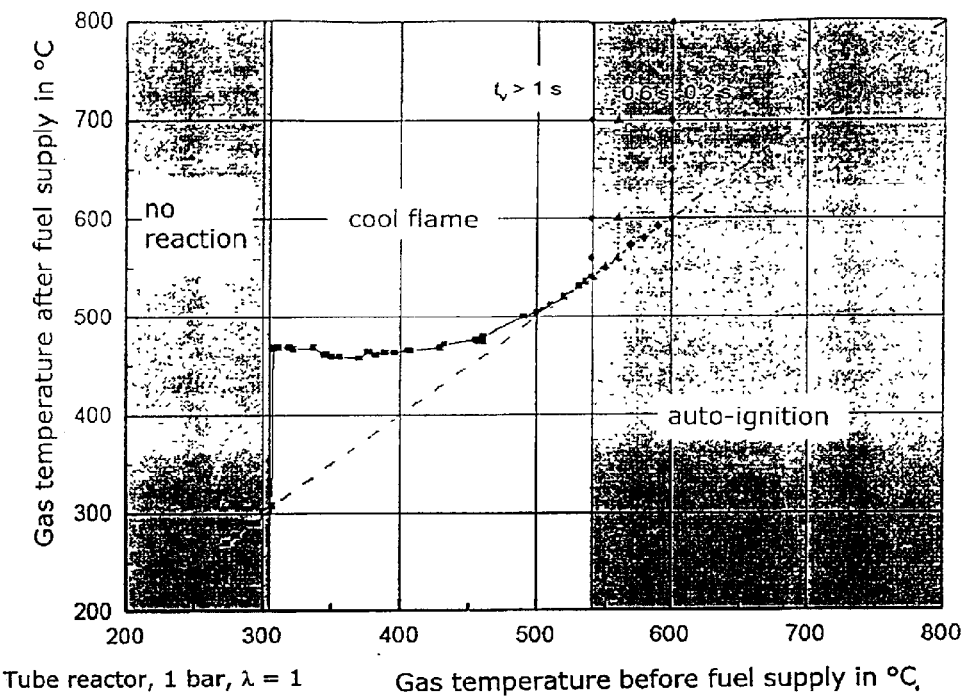
Fig. 3: Zones of the reactions for the atomization of fuel into a hot air stream (extra-light fuel oil, p = 1 bar, λ = 1)
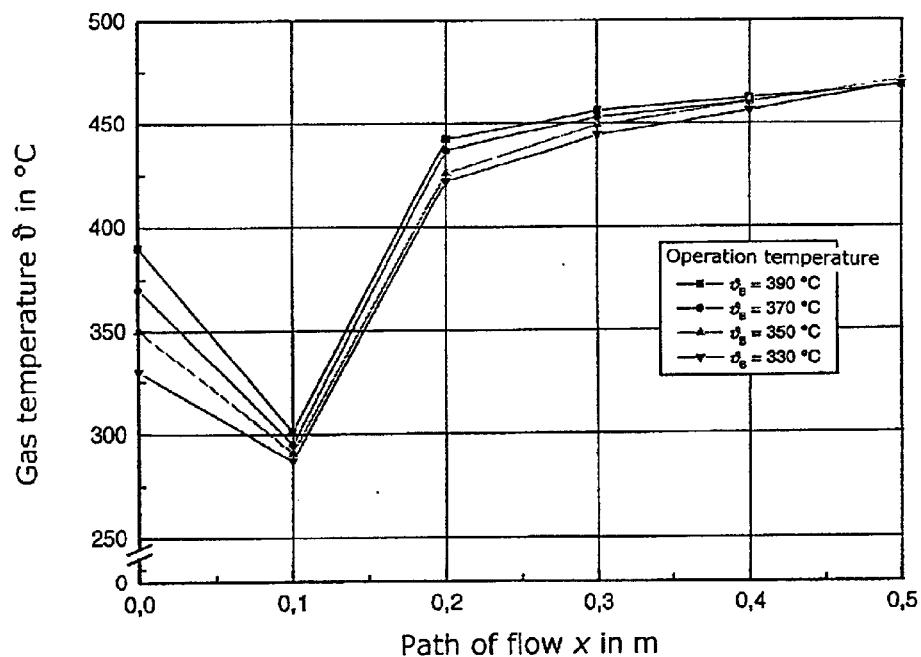
Fig. 4 Temperature course of a cool flame along the path of flow as a function of operation temperature (extra-light fuel oil, p = 1 bar, λ = 1, $t_v$ = 0.9 s)

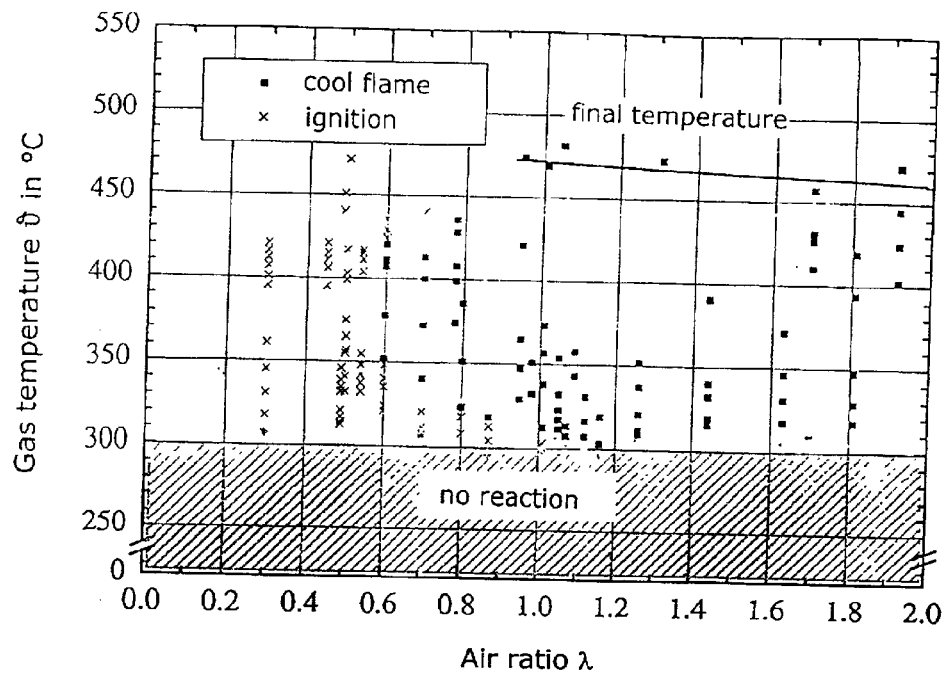
Fig. 5: Zones for starting conditions of the cool flame as a function of air ratio (extra-light fuel oil, p = 1 bar, $t_v$ = 1 s)
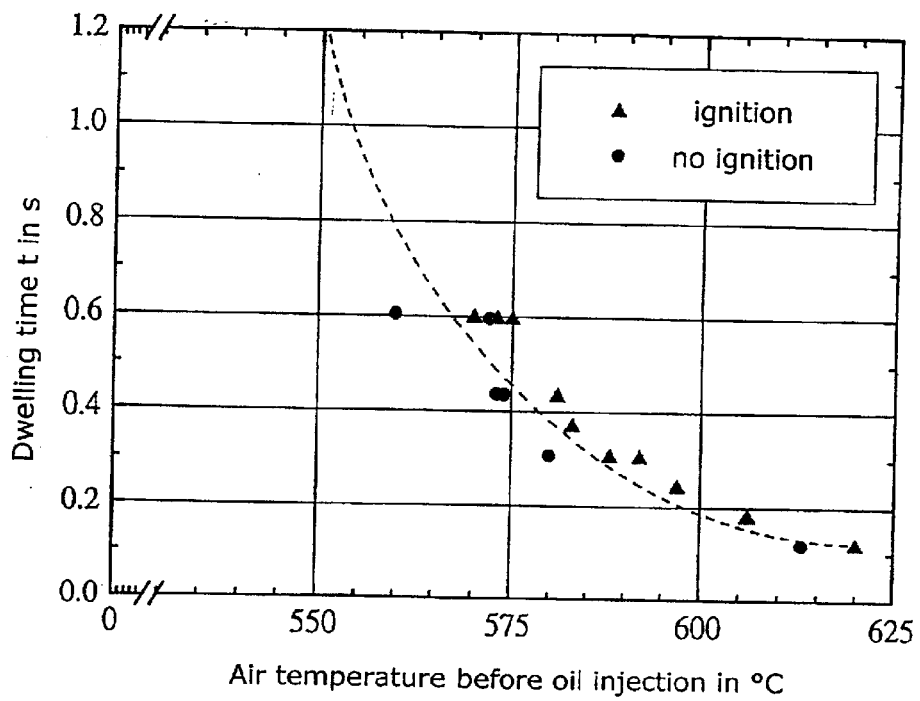
Fig. 6  Representation of ignition delay period of extra-light fuel oil as a function of the air temperature and dwelling time (pressure p = 1 bar)

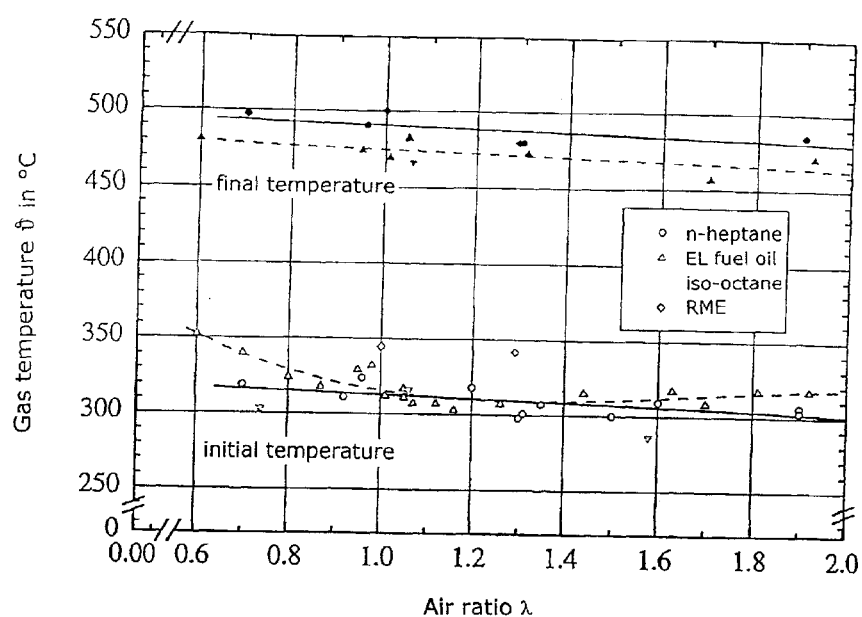
Fig. 7   Initial and final temperatures of the cool flame for different fuels (p = 1 bar)

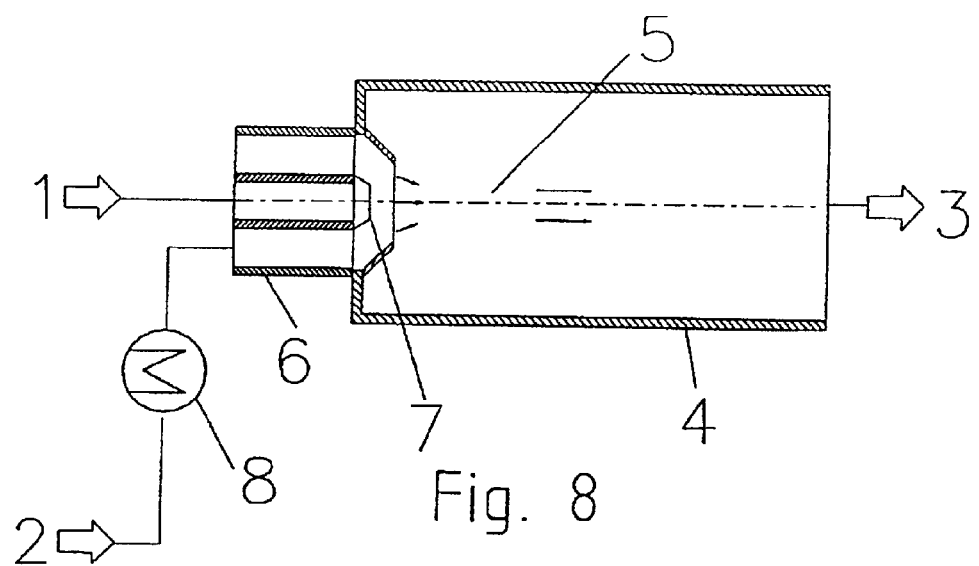

METHOD FOR UTILIZING A FUEL BY USING EXOTHERMIC PRE-REACTIONS IN THE FORM OF A COLD FLAME

The present invention relates to a process for the utilization of a fuel, a product obtainable by the process according to the invention, the use of the product, and a device for producing a mixture for use in the process according to the invention.

Modern low-pollution methods for the combustion of gaseous, liquid and solid fuels share a common constructional feature: a technically sophisticated generation of the mixture. The formation of the mixture is a critical criterion of the quality of combustion. Inhomogeneities of any kind, e.g., distribution of the fuel/oxidant in a combustion chamber, generally result in the formation of pollutants. When the mixture is locally poor in oxygen, unburnt hydrocarbons and carbon black can occur as a consequence of incomplete combustion.

These findings have already resulted in the development of premixing combustion systems. For gaseous fuels, the formation of a mixture with oxygen or air is less complicated. Therefore, improvements could be achieved early in this case.

The formation of a mixture between air and liquid fuels is more complicated to realize technically than for gaseous fuels. There are various ways to produce a homogeneous mixture. The systems involve atomization of the liquid and/or thermal treatment which results in a partial or complete vaporization in the air or exhaust gas.

In middle distillates, designs for the evaporation of liquid films, running down hot surfaces, for example, over extended periods of time raise the problem of formation of depositions on the surfaces of the evaporator. This has been described in various papers, including Brand et al. (1981), Kostka et al. (1982) and Mallog et al. (1983). The depositions are reaction products from cracking reactions occurring at temperatures of above 400° C. However, such high temperatures up to above the final boiling point of the middle distillate (380° C. to 400° C.) are required for a sufficient heat transfer from the evaporator wall to the liquid medium. The depositions lead to a deterioration of heat transfer and thus to fault liability of the system. To avoid the formation of depositions, contact of the liquid fuel with hot walls must be avoided.

BRIEF DESCRIPTION OF THE DRAWINGS

FIG. 1 shows ignition temperature as a function of carbon chain length (Zebetakis et al, 1954);

FIG. 2 shows a schematic course of temperature in a free-radical chain explosion (Wamatz et al., 1993);

FIG. 3 shows zones of the reaction for the atomization of fuel into a hot air stream;

FIG. 4 shows the temperature course of a cool flame along the path of flow as a function of operation temperature;

FIG. 5 shows zones for starting conditions of the cool flame as a function of air ratio;

FIG. 6 shows the representation of ignition delay period of extra-light fuel oil as a function of the air temperature and dwelling time;

FIG. 7 shows the initial and final temperature of the cool flame for different fuels;

FIG. 8 shows a device which is suitable for performing the process according to the invention;

Figure 9:
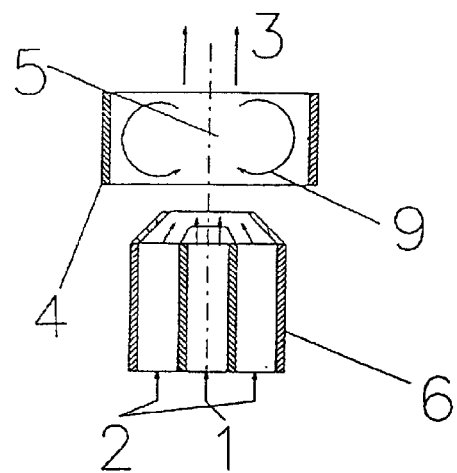
FIGS. 9a–9c show three established methods for the recirculation of reaction products.
Figure 9:
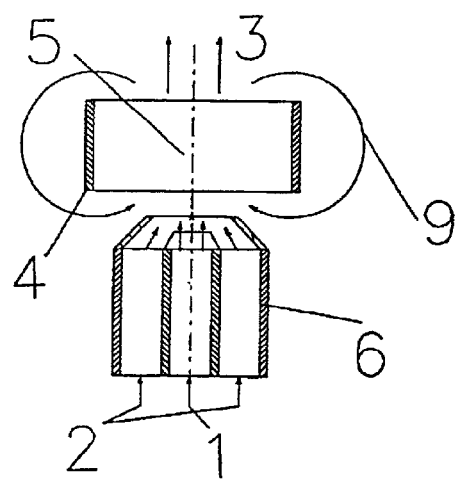
Figure 9:
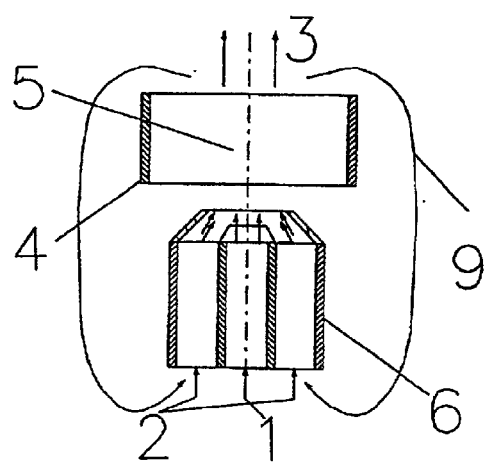

Novel burner designs for liquid fuels, such as surface burners, make very high demands on the formation of the fuel-air mixture. In addition to the approaches for the formation of homogeneous mixtures, there are also premixing approaches which realize a quasi-homogeneous production of the fuel-air mixture. In the surface burner from the Publication DE 196 06 560, the fuel is heated to from 100° C. to 800° C. under pressure and injected into a mixing chamber. Due to the high pressure drop at the valve exit, very small colloidal droplets, as compared to conventional pressure atomization, are produced which have a certain stability due to the aggregation-inhibiting mechanisms. In the aerosol burner of Schilling (1997), an oil mist is produced by passing heated air through an oil-wetted sinter metal layer. In the Publication DE 196 25 217, the liquid fuel is injected through a nozzle into the heated air stream with conventional pressure atomization and vaporized. Depending on the selected process parameters (temperature, air quantity, flue gas quantity), a partial chemical reaction of the oil can be achieved.

For direct vaporization, the fuel may also be introduced in a preheated air stream and completely vaporized there with further addition of heat. However, in theory, the necessary temperatures lead to auto-ignition of the mixture. In the formation of mixtures of gases, such as methane (natural gas), this is much less likely to occur (FIG. 1). Further, it is possible to first vaporize the fuel with steam and subsequently mix it with the combustion air (Stoffel et al., 1995).

In contrast to purely thermal ignitions, the ignition of hydrocarbons proceeds through the formation of reactive free radicals which induce the system to ignite (Warnatz et al., 1993). The formation of such free radicals proceeds through chemical branched-chain reactions and takes some time. Although chemical conversion occurs during this so-called induction period, the temperature of the mixture remains largely constant (FIG. 2).

Thus, from a thermal point of view, the induction period described is an ignition delay period of the system. It depends on the temperature and pressure of the mixture. To date, results of investigations have been obtained mainly for marginal conditions in the fields of gas turbines and engine combustion, i.e., at increased pressures and high temperatures. The determination of the ignition delay period is highly dependent on the experimental conditions, especially on the experimental apparatus. The values reported in the literature (Lefebvre, 1982; Pitsch, 1995; Spadaccini, 1982) are differing accordingly. For determining the ignition delay periods, Lefebvre used a tube reactor in which fuel injection is done in a heated air stream and the ignition delay period is equal to the induction period up to the start of the reaction (FIG. 2). In engine combustion, knock can be initiated by auto-ignitions, time-shifted by the ignition delay. In gas turbines, the use of premixture combustion for reducing nitrogen oxide levels is complicated by the auto-ignition of the mixtures at high pressures. Here, only the period of ignition delay, which is in the range of a few milliseconds at high pressures, is available for the formation of the mixture.

The increase of the temperature of a mixture in direct fuel addition into a preheated air stream can be accounted for by exothermic reactions of the hydrocarbons with atmospheric oxygen. These result in ignition of the mixture. In the literature, the same effects are described with "cool flames" (Coffee et al., 1979; Affens et al., 1979). Coffee discovered the phenomenon of cool flames when investigating into the avoidance of knock. However, under engine reaction conditions (dwelling time, pressure and temperature), cool flames always lead to auto-ignition of the mixture. Affens describes the cool flames under atmospheric conditions as a negative effect under safety aspects.

For an n-heptane mixture, the reactions of the cool flame results in an increase of temperature in the reaction tube and stabilization on the increased level (Freytag, 1965). This reaction is characterized by a pale bluish luminescence. The limitation of the proceeding chemical reactions is based on complex fuel-specific mechanisms. Warnatz describes a model for explaining the limitation at a certain temperature level, similar to the phenomenon of cool flames. In low-temperature oxidation (800 K–900 K), the equilibrium reaction of hydrocarbon free radicals with oxygen to give peroxyl free radicals is critical.

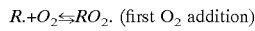

$R·+O_2 \leftrightarrows RO_2·$ (first $O_2$ addition)

This reaction is followed by further reactions of chain propagation and chain branching. The key of the formation of cool flames is in the lack of thermal stability of the chain reaction precursors formed by the oxygen addition. At higher temperatures, the chemical equilibrium is again shifted to the side of the hydrocarbon free radicals. Thus, the peroxyl free radicals decompose, and ignition is prevented.

It has been the object of the invention to overcome the mentioned drawbacks of the prior art. This relates essentially to the formation of a mixture of liquid fuel and oxidant. Usually, the formation of the mixture is determined by a superposition of the effects of mixing, evaporation and high-temperature oxidation, which can be separated in time and space by the ignition delay period only in a limited way. In the process according to the invention, the cool flame is in addition made use of purposefully for positively influencing properties of matter.

This object is achieved by a process for the utilization of a fuel having an initial boiling temperature or prevailing initial boiling temperature range at 1 bar of between 231 K and 830 K, characterized by the following features:

(a) the fuel is contacted with at least one oxidant preheated to from 520 K to 880 K at a pressure, p, of $\geq 1$ bar, or at a lower pressure with a reduction of the temperature range, and a C/O molar ratio of between 1:0.14 and 1:25 in a reaction space to initiate exothermic prereactions in the form of a cool flame which cause only partial conversion of the fuel and oxidant even when the fuel and oxidant are homogeneously mixed; and (b) a kinetic reaction inhibition of the further reaction of the oxidizable mixture formed in the cool flame is provided by adjusting a technically relevant dwelling time $t_v$ of the mixture prepared in step (a) in the reaction space of $t_v > 25$ ms at p·1 bar, and dwelling times which become shorter when the pressure is increased under otherwise equal conditions, and a limited heat dissipation from the reaction zone through an inert gas stream with a ratio of the heat capacity flow of the oxidant, $\dot{M} \cdot c_p$, to the product of fuel mass flow, $\dot{M}_b$, and heating value, $H_u$, which is, in the adiabatic reaction space, $\dot{M} \cdot c_p / \dot{M}_b \cdot H_u > 2 \cdot 10^{-4} K^{-1}$, and/or through the reactor wall with a heat flow density, $\dot{q}$, of $\dot{q} < 85$ kW/m$^2$, whereby auto-ignition of the mixture is prevented, especially for a predictable period of time.

The state parameters include, in particular, the total pressure, the partial pressures of the educts, especially the oxidant and fuel, and the initial temperatures of the educts. The process parameters include the geometrical data of the apparatus, the dwelling time, the heat flows directed inside or outside through the walls of the apparatus, and the recirculation ratio of the recirculated product flow into the reaction zone to the educt flow employed.

Preferably, the dwelling time $T_v$ is greater than 500 ms at $p \leq 1$ bar.

The dwelling time is the time during which the mixture formed in the cool flame remains in the respective reaction space. The dwelling time is determined by dividing the reactor volume V by the volume flow of the mixture, $\dot{V}$, i.e., $t_v = V/\dot{V}$. By the process according to the invention, the dwelling time of the mixture in the reaction space can be longer than the ignition delay period established by the Lefebvre method.

The process according to the invention makes use of the phenomenon of the cool flame. Whereas the cool flame has been described as a disadvantage to be avoided in the prior art to date, the phenomenon is now made use of purposefully in the process according to the invention. Using the process according to the invention, important processes which can currently be operated exclusively on the basis of gases (mainly natural gas) can be extended to the use of liquid fuels. Thus, for example, when extra-light fuel oil is used, the process according to the invention converts the liquid fuel phase to a gaseous phase. For example, in contrast to conventional oil burners, the use of a homogeneous fuel gas/air mixture enables the pollutant and noise emissions from combustion to be significantly reduced and more compact boiler systems to be employed.

The cool flames are exothermic reactions of the, especially liquid, fuel in the presence of an oxidant which result in a spontaneous temperature increase of up to 180 K. In principle, endothermic reactions also occur in addition to the exothermic reactions. At any rate, the overall reaction is exothermic. Similar temperature increases may also be achieved by a partial oxidation of the fuel by correspondingly reducing the amount of air. One difference to the cool flame reaction is that only partial conversion of the oxidant and fuel occurs in the cool flame. In partial oxidation, the fuel supplied is only partially converted because only a limited amount of oxidant is available. In contrast to the cool flame, the supplied oxidant is consumed completely in the reaction.

For example, when extra-light fuel oil is employed as the fuel, the cool flame forms a mixture of ketones, aldehydes and other compounds. The first initiation of the chemical reactions of the cool flame requires a defined temperature or temperature range of the oxidant. This temperature is set as the initiation temperature. Data settings for the initiation temperature for extra-light fuel oil can be seen from FIG. 3. In contrast, the temperature after the cool flame has been initiated is defined as the operating temperature. The operating temperature is that temperature which ensures a stable operation of the cool flame. In practice, the range between the minimum and maximum temperatures for the operation of the cool flame is greater than that for its initiation.

For example, for extra-light fuel oil, the increase in temperature starts for an air ratio of λ–from 0.7 to 2.0 and atmospheric pressure at an initiation temperature of about 310° C. Useful fuels include, essentially, hydrocarbons, mixtures of hydrocarbons with non-hydrocarbons in the form of emulsions and/or suspensions with liquids substantially insoluble in hydrocarbon, especially water in admixture with ammonia, hydrogen sulfide and/or alkanols, especially $C_1$–$C_4$ alkanols.

The oxidant is a substance or mixture of substances which has a higher chemical oxidation potential as compared to said, especially liquid, fuel. Preferably employed are oxygen, ozone, air, exhaust gases from superstoichiometric combustion, an oxygen-containing compound, such as a compound containing peroxides, sulfur oxides, nitrogen oxides ($N_yO$ or $NO_x$), or mixtures thereof.

When the fuel is added to an air stream supplied under atmospheric pressure, exothermic prereactions between the fuel, such as extra-light fuel oil, n-heptane, RME or isooctane, and oxidant, preferably air, occur at temperatures of above 310° C. FIG. 3 shows the results of experiments performed by the inventor in which extra-light fuel oil as the fuel is mixed into a hot air stream at the start of the path of flow. Below a temperature limit of 310° C., no increase in temperature could be measured. This means that reactions do not proceed, or only slightly so, at these temperatures. From an air temperature of 310° C. upwards, a temperature increase to about 480° C. occurred.

For extra-light fuel oil/air mixtures, a temperature of 480° C. is evidently a limiting value, because the further increase of the air temperature prior to fuel atomization did not increase the temperature of the mixture. Thus, this temperature can be considered an equilibrium temperature of the described oxidation reaction of the cool flames. At an air temperature of above 480° C., the increase in temperature of the mixture has become very low. Exothermic reactions in the form of the cool flames do not appear to proceed anymore under the boundary conditions chosen. If the air temperature is increased to above 540° C., the range of auto-ignition of the mixture begins, which is subject to ignition delay (see also FIG. 6).

The temperature course of the cool flame along the path of flow as a function of the initial temperature is shown in FIG. 4. As can already be seen from FIG. 3, the final temperature of the cool flame is essentially independent of the initial temperature. The initial temperature drop prior to the start of the cool flame results from the evaporation heat of the liquid fuel.

When a mixture is formed from liquid fuels, effects of evaporation and of mixing with the oxidant become superimposed. For determining the individual effects in detail, both the injection of the liquid fuel into the air stream and the addition of prevaporized fuel have been examined. It was found that the final temperatures of the cool flames reached similar values independently of the type of fuel addition.

In view of the operation of combustion systems, the influence of the air ratio on the process according to the invention is of some interest. An increase of the air ratio hardly results in any changes of the final temperature of the mixture after the addition of the fuel. A higher air ratio means an increased diluent mass flow which takes up more heat in the temperature increase by the process according to the invention. FIG. 5 shows the phenomena arising as a function of the starting conditions. The square dots represent set values at the beginning of the fuel addition which result in the formation of a cool flame. A final temperature of between 470° C. and 480° C. will appear.

In the substoichiometric range, in addition to the range of formation of a cool flame, there are also ranges of initial settings, represented by crosses, which result in ignition of the mixture. By selected measures of temperature control in the range of the cool flames, e.g., by heat dissipation through the exterior wall of the reactor, the ignitions in the substoichiometric range can be avoided, and a safe operation of the cool flames can be ensured.

In the range of temperatures of up to 540° C., ignitions of the mixture could not be observed. In contrast, when the temperature of the air stream is increased to above 550° C. to 600° C., the mixture will ignite. Ignition does not occur when the dwelling time is below the ignition delay period $t_v$. The boundary between the established ignition conditions and the conditions of ignition delay represents the sought dependence of the ignition delay period on temperature (FIG. 6). The results show that the ignition delay periods of middle distillates are within a range of several tenths of seconds under atmospheric conditions.

Below 550° C., ignition delay periods of above one second can be expected. From the course of the ignition delay period, a boundary temperature within the technically interesting time range can be expected. Below this temperature, ignition can be excluded with certainty. Thus, it becomes possible to produce a homogeneous mixture of fuel, oxidant and cool flame products in a mixing chamber and safely convey it.

Further, experiments with different fuels have been made (FIG. 7). It was found that the initial and final temperatures of the fuels employed are almost identical. Apart from the initial temperature of RME which is increased due to the boiling range of from 330° C. to 340° C., all temperatures are within a narrow band. Thus, it could be shown that the dependence of the cool flame on the boiling point or boiling course of the hydrocarbon is small. The binding type of the hydrocarbons does not have a significant influence either.

FIG. 8 shows a device which is particularly suitable for performing the process according to the invention. The data shown in FIGS. 3 to 7 were measured under atmospheric pressure conditions using such a device. Reference 4 designates a reaction tube which is connected to an oxidant addition and mixing means 6. The term "oxidant 2" as used herein is generally intended to mean the substances which have a higher oxidation potential as compared to the fuel 1. In the usual applications, this is air or molecular oxygen, but may also be recirculated gases from a superstoichiometric combustion. However, other gases having a higher oxidation potential as compared to the fuel may also be considered for utilization in the process according to the invention, such as sulfur oxides.

Fuel 1 is supplied to mixing means 6 via a fuel nozzle 7. The term "fuel 1" as used herein primarily comprises all fuels containing hydrocarbons, such as middle distillates or the like. In addition, it is also intended to mean mixtures of hydrocarbons with non-hydrocarbons. These are supplied to the process separately or as an emulsion and/or suspension. The substances designated as non-hydrocarbons are intended, on the one hand, to contribute to process optimization and include water, in particular. On the other hand, admixture with non-hydrocarbons may have the purpose of achieving utilization of these additional substances, such as carbon, by the process according to the invention.

From the mixing means 6, the generated fuel/oxidant mixture flows axially through the reaction tube 4. To initiate the exothermic reactions of the cool flame, a suitable choice of the state and process parameters is required. For illustrative purposes, the process shall be described in detail for extra-light fuel oil as the fuel 1 and air as the oxidant 2. In the present example, the reaction tube consists of an isolated thin-walled stainless steel tube having a length of 1000 mm and a diameter of 100mm (see FIG. 8). The oil is supplied through a conventional pressure atomization system 7, the fuel power being from 10 to 20 kW. The air is supplied to mixing means 6 under atmospheric pressure conditions with a mixing pressure of 500 to 700 Pa. To initiate the cool flame, the air stream must be heated correspondingly. Thus, the air 2 supplied to the mixing means is heated to the initiation temperature by an air preheater. Experiments with the adiabatic cool flame generator represented in FIG. 8 in which the wall heat losses are to be avoided by a jacket heating (ideal isolation) yield a preferable range of the initiation temperature of from 310° C. to 450° C. It is found that the influence of the setting of air ratio $\lambda$ is negligible. For example, for a power of 12 kW and $\lambda=1.0$, an oil mass flow rate $\dot{M}_b=1.0$ kg/h and an air mass flow rate $\dot{M}_L=13.5$ kg/h must be set. The cool flame can then be securely initiated by varying the oil mass flow rate at an air ratio in the range of $\lambda=0.3$ to 2.0. In a darkened room, the cool flame is manifested by a pale bluish luminescence and can be detected by measuring a limited temperature increase to about 480° C. The cool flame product is a mixture which can be ignited by spark ignition.

The term "air ratio $\lambda$" as used herein describes the ratio of the supplied amount of oxygen to the minimum oxygen amount required for a complete conversion of the fuel employed.

In the reaction zone 5, the exothermic reactions of the cool flames induce a spontaneous rise of temperature which can be attributed to a partial conversion of the fuel. Partial conversion of the fuel is a characteristic feature of cool flames, differentiating them from conventional combustion. When the fuel/oxidant mixture is homogeneously mixed and a substoichiometric reaction is kept in the cool flame, for example, $\lambda=0.5$, an oxygen concentration which is still relatively high can be detected in the cool flame products 3. In contrast, in substoichiometric combustion, the available oxygen is completely consumed (to close to the detection limit) for the same air ratio. Thus, the cool flame products 3 are composed of the reaction products of the cool flame, but also of the partially converted educts, i.e., fuel and oxidant.

Due to the inhibition of reaction kinetics as characteristic of the cool flame, the temperature rise of the mixture is limited so that auto-ignition of the cool flame products 3 formed in the cool flame is avoided. For the use of extra-light fuel oil and air under atmospheric pressure conditions, a maximum temperature of the mixture of about 480° C. is obtained, which is largely independent of the air ratio setting (see FIGS. 5 and 7).

Depending on the starting boiling temperature or temperature range, the fuel designated as 1 is supplied to the process in a liquid or gaseous form. In particular, the generation of a mixture from liquid fuels is a serious problem is many technical applications. A poor atomization of liquid fuels results in inhomogeneities in the generation of the mixture and thus in the formation of pollutants. The process according to the invention essentially contributes to an improvement of mixture generation. The reaction mechanism of the cool flames leads to a molecular chain length reduction of the hydrocarbons which substantially contributes to a lowering of the boiling temperature or temperature range. The hydrocarbons employed in a liquid form can be converted to gas phase, which substantially improves the generation of the mixture. After cooling to ambient temperature conditions, the product is in one of up to three states: in gaseous, liquid or colloidal (mist/aerosol) phase. The proportion of the colloidal phase may be predominant. Further, due to its temperature level, the process according to the invention substantially contributes to vaporization of the liquid fuel.

The energy released from the exothermic reaction of the cool flame supports vaporization and produces a mixture of gases which, depending on the process parameters, e.g., heat dissipation through the exterior wall of the reactor, is not subject to auto-ignition under either superstoichiometric or substoichiometric conditions.

The initiation and/or operation temperature of the cool flames can be lowered by a number of measures. From combustion engineering, it is known to recirculate reaction products into the reaction zone. In FIGS. 9a to 9c, based on the cool flame generator shown in FIG. 8, three established methods for the recirculation of reaction products are shown. In all methods, the cool flame products 3 are recirculated into the reaction zone 5. In FIG. 9a, recirculation is effected within the reaction tube 14. This is referred to as internal recirculation. In contrast, the reaction products 3 in FIGS. 9b and 9c are supplied to the reaction zone 5 outside the reaction tube 4 (external recirculation). FIGS. 9b and 9c differ by the site of introducing the reaction products 9.

The recirculation of cool flame products and/or products from subsequent process steps into the vaporization zone enables the operation temperature of the cool flame to be lowered. The, especially liquid, fuel is subjected to a phase transition in a mixture of air and products of the cool flame. Recirculation of the cool flame products increases the inert gas stream, which inhibits the proneness to auto-ignition, especially for highly substoichiometric operation modes.

In addition, the reaction kinetics of the cool flames can be influenced by a well-aimed decrease in pressure, and the starting temperature thereby lowered. The addition of appropriate catalytically active substances lowers the activation energy required for initiating the cool flame and thus contributes to lowering the starting temperature.

Figure 10:
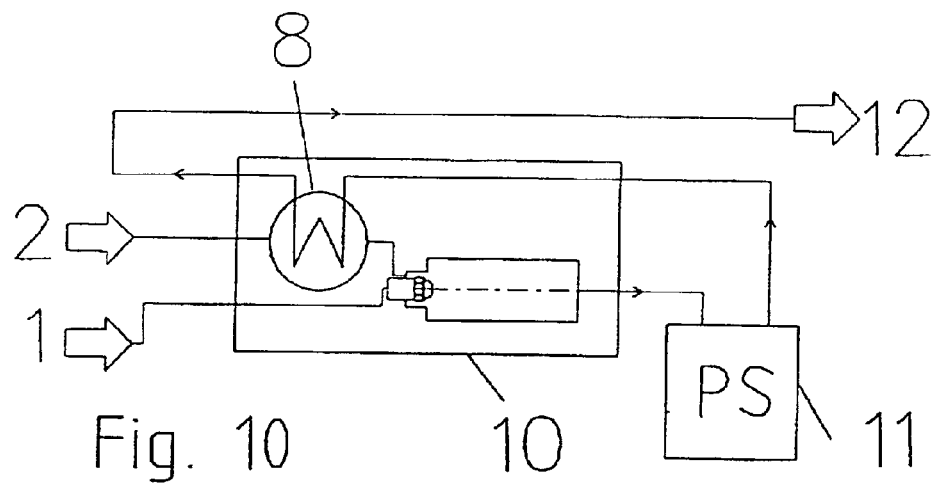
FIG. 10 provides an example of the introduction of heat into the cool flame generator.

Achieving the initiation or operation temperature (commonly referred to as "initiation temperature" in claim 6) requires heating of the oxidant stream. FIG. 10 provides an example of the introduction of heat into the cool flame generator 10 represented in FIG. 8. The cool flame product 3 leaving the cool flame generator 10 is supplied to a subsequent process step 11, the temperature of the mixture 12 exiting from process step 11 being above the oxidant temperature. The heat quantity required for initiating the cool flame is withdrawn from mixture 12 by the oxidant preheater 8 and supplied to oxidant 2.

Figure 11:
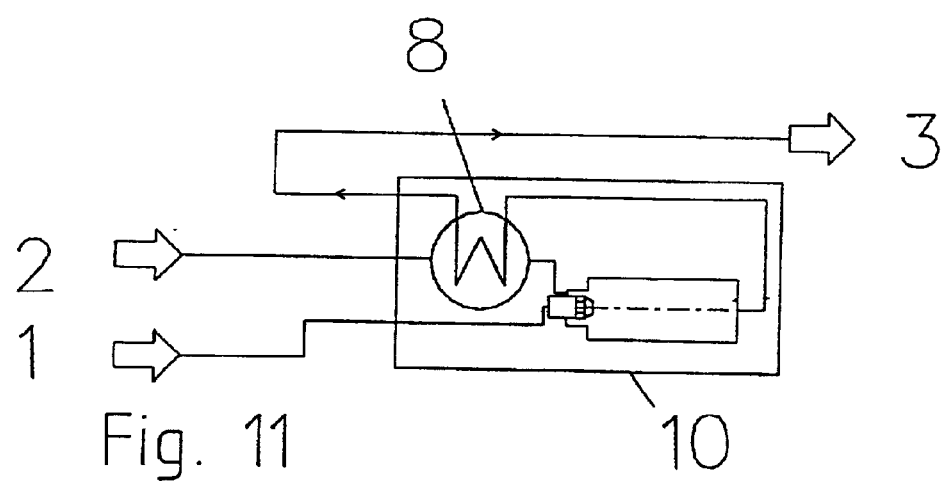
FIG. 11 shows the process sequence.
Figure 12:
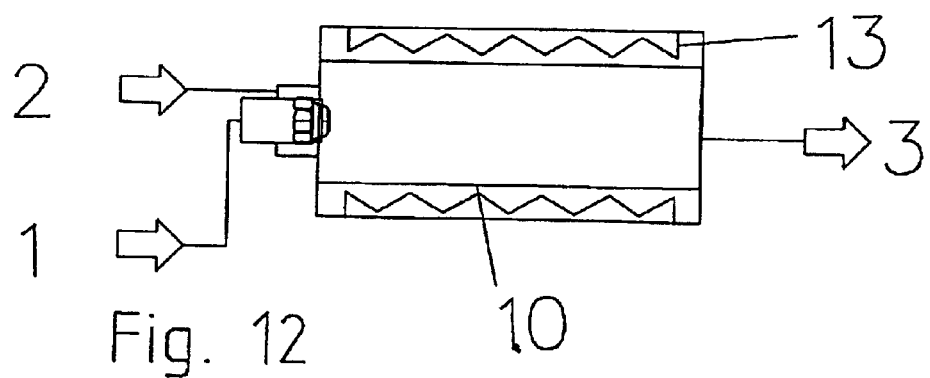
FIG. 12 shows another possibility of heat introduction.

In the process sequence in FIG. 11, the heat required for reaching the operation temperature is directly withdrawn from the cool flame product 3 and supplied to oxidant 2 via the oxidant preheater 8. Another possibility of heat introduction is illustrated in FIG. 12. In this variant, heat introduction is effected into the fuel/oxidant mixture via the reaction tube 4 of the cool flame generator from FIG. 8. For example, the heat can be supplied by electric heating or by any desired heat capacity flow. Another form of heat introduction by fuel preheating is possible.

After cooling to ambient temperature, the cool flame product 3 obtained in the cool flame generator (FIG. 8) is in a gaseous, liquid and/or colloidal phase. Due to the molecular chain length reduction of the hydrocarbon chains usually supported by the cool flame, the boiling temperature or temperature range of the cool flame product 3 is in all cases below that of the fuel 1 employed.

The cool flame product 3 can be influenced as needed by selecting the state and process parameters. For applications of mixture generation or synthesis gas production, it is required that the fuel be substantially converted to gas phase. From experiments performed by the inventor, it is known that the final temperature of the cool flame establishes at a constant value almost independently of the starting temperature (see FIGS. 3 and 4). From an energetic point of view, low operation temperatures within the range of operation temperatures result in a correspondingly higher fuel conversion due to the higher temperature difference. Gas analyses of the cool flame product confirm that a higher fuel conversion in the gas phase establishes at low operation temperatures.

The process according to the invention is advantageously employed for the processing and/or refining of liquid hydrocarbons, especially in refining plants or in chemical process engineering, synthesis gas production, protective gas production, for the provision of gaseous fuels for fuel cells in mobile or stationary use, such as in motor vehicles, rail vehicles, ships, aircrafts, and/or in coupled heat and power for combustion in combustion engines and/or firing plants, for the separation of product streams from accompanying substances and the like.

The process according to the invention enables combustion techniques which have previously been used exclusively for gaseous fuels to be applied for liquid fuels as well. The use of liquid fuels is possible in innovative systems for the supply of heating energy and/or electric energy, coupled heat and power generation in block-type thermal power stations, because, due to complete vaporization, the advantages of gas engines can be combined with the lower fuel costs of liquid fuels. Exhaust gas aftertreatment is highly simplified by this application or may even be completely omitted. As a further example, the use in Stirling engines may be mentioned. In this case, the cool flames may be integrated as a preliminary stage in the heat generation process.

In the use of liquid fuels in fuel cells, the process according to the invention may be used as a "carburetor". The requirement of supplying the process with a homogeneous process gas having a high fuel value is met. Especially for mobile applications, an essential advantage is the simple handling of the original fuel in terms of storage and safety.

The process according to the invention produces a mixture having new properties. The composition of the fuel changes due to the chemical reactions. Temperature measurements at ambient pressure and under stoichiometric conditions show that 10% of the chemical energy bound in the fuel (extra-light fuel oil), for example, is already converted in the process according to the invention for operation temperatures of around 300° C. and atmospheric pressure, almost independently of the air ratio. Mainly long hydrocarbon chains react by oxidation and degradation reactions to yield short molecules.

The boundary conditions of the process can be set to confer to the product obtained a boiling range substantially lower than that of the original fuel. Thus, additional process steps become possible for the use of this technology in new fields of application. It is possible to perform a limited recooling of the gas, which permits a safe handling of the mixture. Ignition by a free-radical chain mechanism be completely suppressed. Thus, it is possible to safely store and convey the product gas from the processing to the consumer. Thus, the modulation range can be decoupled from the variable power consumption of an arbitrary consumer.

In addition, it is possible to control the process in such a way that even building blocks of petrochemical synthesis (e.g., olefins or formaldehyde) are selectively obtained in high yields, and separation of such hydrocarbons from the product gas becomes economic.

A large field of applications for the cool flame is in the preparation of all kinds of synthesis gases. "Synthesis gas" is intended to mean both gas streams produced and employed in a continuous process and those stored after production and employed at a later time.

For example, in material refining (e.g., of metals), it is required to produce a reducing (or endothermic) atmosphere which prevents oxidation of the material to be processed. An endothermic atmosphere is usually prepared by substoichiometric combustion of natural gas with admixture of water. The main components of such an endothermic gas are CO, $CO_2$, $H_2$, $H_2O$ and inert gas components. The composition of the endothermic gas can be influenced by the setting of the process parameters (water/fuel ratio, air ratio and temperature). When liquid fuels are used in substoichiometric combustion, carbon black is formed, which is undesirable. The process according to the invention allows conversion of liquid fuels into gas and vapor phase in a highly substoichiometric atmosphere without substantial depositions of carbon black.

The process according to the invention is advantageously employed for driving all kinds of mobile devices, especially vehicles. For example, the process according to the invention yields processed fuels for Otto and diesel engines and/or fuel cells.

Similarly, the process according to the invention yields processed fuels employed for the generation of mechanical or electric power and/or heat in immobile devices. For example, the processed fuels can be used in block-type thermal power stations, electric power generators, fuel cells and firing plants.

Preferably, in the process according to the invention, air and/or oxygen is used as the oxidant, and the educts from step (a) of the process according to the invention are supplied substoichiometrically, preferably at an air ratio of $\lambda=0.2$ to 0.7. By adding water or steam, the gas components required for the preparation of endothermic gas can be synthesized.

In a preferred embodiment of step (b) of the process according to the invention, an additional product stream essentially consisting of hydrocarbons or mixtures of hydrocarbons and non-hydrocarbons is supplied to step (b). In the preparation of synthesis gas, "non-hydrocarbons" means water and/or steam, in particular, which essentially contribute to process improvement by reducing the carbon black formation propensity. In another embodiment of the process according to the invention, air may be supplied as a non-hydrocarbon to achieve air-graded combustion (air gradation). As in the preparation of synthesis gas, the cool flame is set at a low air ratio, for example, at $\lambda<1$. To adjust the required oxygen level, e.g., to initiate complete combustion, the cool flame product is subsequently admixed with air or exhaust gas from a superstoichiometric combustion.

Figure 20:
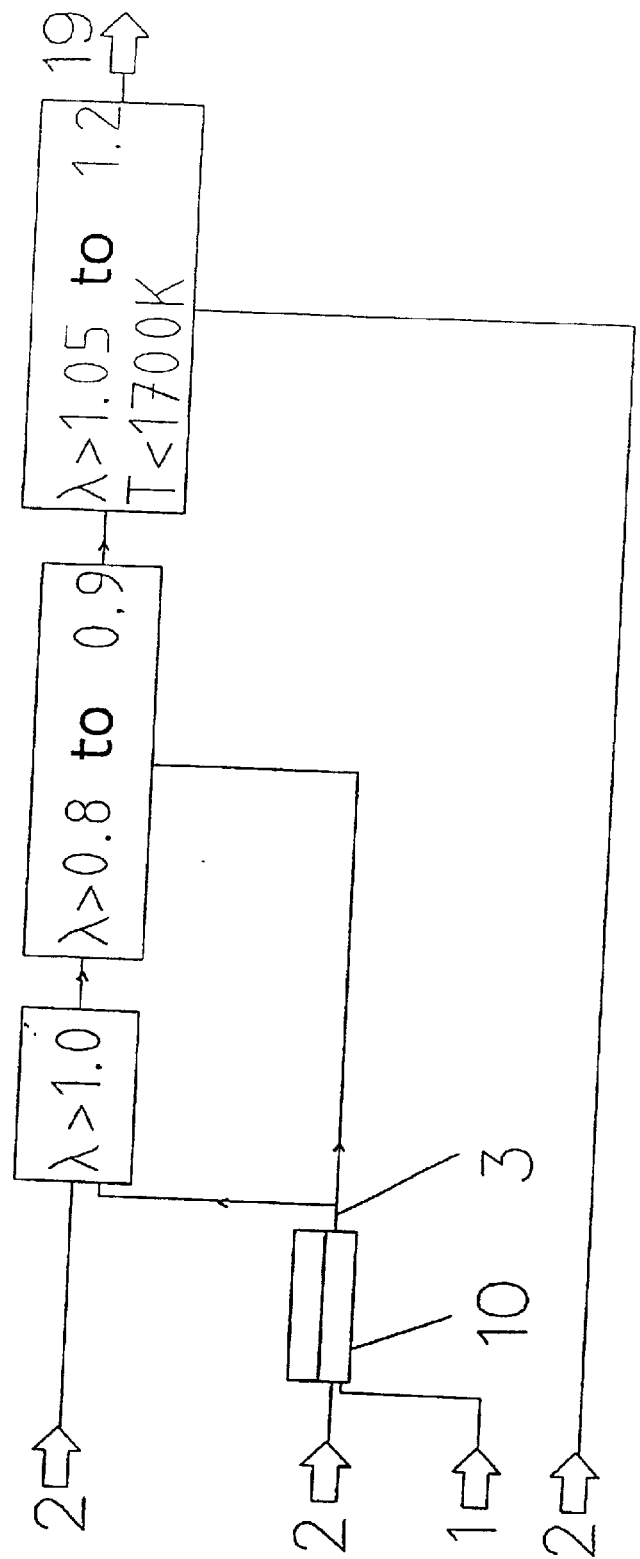
FIG. 20 shows another example of a combustion process with fuel gradation for the reduction of nitrogen oxide levels.

FIG. 20 shows another example of a combustion process with fuel gradation for the reduction of nitrogen oxide levels in which an additional product stream is added to the mixture of step (b) from claim 1. In the so-called three-step combustion, the substoichiometrically produced cool flame product 3 is reacted with air 2 in the primary step superstoichiometrically with a high NO production. The proportion of the introduced cool flame product in this step, based on the product produced in the cool flame generator 10, is about 70%. In the second step, the residual cool flame product is admixed so that an overall reducing atmosphere is established in which the NO formed in the first step is then reduced to $N_2$. In the prior art, the injection and mixing of the liquid fuel in the second combustion step is an essential problem. Oil injection into a hot gas stream frequently evokes cracking reactions and depositions of oil components in the area of the oil-carrying parts and hot surfaces, which is overcome by the process according to the invention. The completion of combustion is effected in the tertiary step where overall superstoichiometric conditions are created by the addition of so-called residual air.

In energy conversion systems, fuel cells will gain importance in the future. According to the current state of the art, they are preferably supplied with gaseous fuels for energy production. In particular, molecular hydrogen is considered the main energy carrier for fuel cells. In addition, some fuel cells also enable short-chained hydrocarbons and also carbon monoxide to be used. To enable the use of liquid fuels for fuel cells, technically complicated conversion processes are required, such as steam reforming, autothermal reforming or (catalytic) partial oxidation. Methods established on an industrial scale cannot be scaled down to the power ranges relevant to fuel cells without problems. Due to the process principles, these methods involve carbon black formation, inter alia, and, due to the high process temperatures, losses in efficiency.

The phenomenon of the cool flame is made use of herein to solve the mentioned problems. As already described in the preparation of synthesis gas, the process according to the invention enables the conversion of liquid fuels to gas phase. Experiments performed with extra-light fuel oil and air under atmospheric pressure conditions in a device according to FIG. 8 confirm that the process can be performed without deposition of carbon black at an air ratio of $\lambda=0.3$, which is relevant to fuel cells. With an additional member for recirculation according to FIG. 9b and a dwelling time of $t_v=0.85$ s, the air ratio at ambient air can even be decreased to $\lambda=0.1$.

Preferably, in the process according to the invention, air and/or oxygen is used as the oxidant, and the educts from step (a) of the process according to the invention are supplied substoichiometrically, preferably at an air ratio of $\lambda=0.2$ to 0.7. Depending on the process sequence, it may be appropriate to use the oxygen-containing exhaust gas of the fuel cell reaction at least as part of the oxidant.

Preferably, the product obtained from step (b) of the process according to the invention is converted to a fuel gas suitable for fuel cells, such as hydrogen or a fuel gas mixture of hydrogen, carbon monoxide and/or short-chained hydrocarbons, by known process steps, preferably partial oxidation, steam reforming and/or shift conversion (water-gas reaction).

Figure 13:
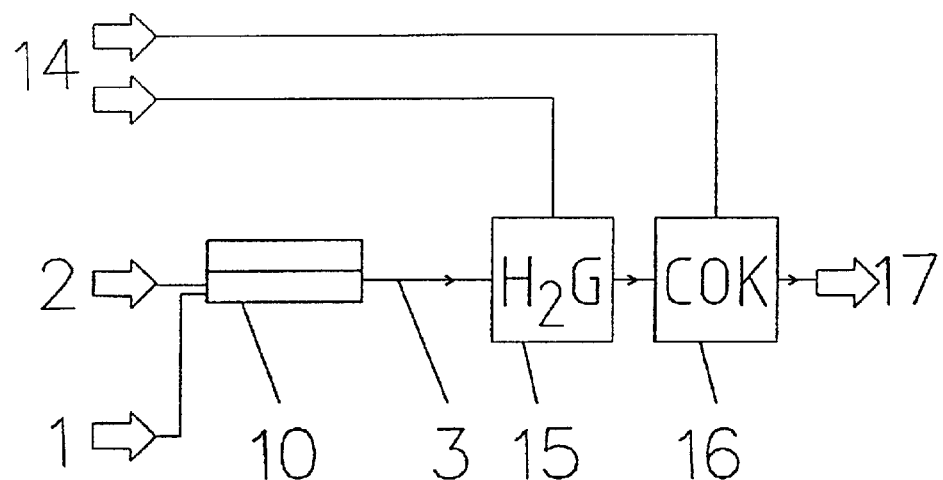
FIG. 13 represents an example of the conversion of liquid fuels to a fuel gas suitable for fuel cells.

FIG. 13 represents an example of the conversion of liquid fuels to a fuel gas suitable for fuel cells. The term "fuel gas suitable for fuel cells" is intended to mean those gas mixtures, designated with 17, which can be used as a fuel for fuel cells. Depending on the type of fuel cell, such as membrane fuel cell (PEMFC) or the high-temperature fuel cells (SOFC, MCFC), different requirements for the composition of the fuel gas ensue. For use in fuel cells, "fuel 1" is intended to mean preferably middle distillates, such as extra-light fuel oil, diesel and carburetor fuels, kerosine or the like.

Fuel gas suitable for fuel cells can be prepared, for example, by dosing extra-light fuel oil and the preheated combustion air substoichiometrically with a low air ratio, especially $\lambda=0.1$ to 0.5, and introduce them into a cool flame process. Said preheating may be effected by the methods described above. The product mixture 3 leaving the cool flame generator 10 is utilized in a subsequent process step for $H_2$ generation 15. This may be followed by technically known processes, such as (catalytic) partial oxidation or autothermal reforming. For optional CO conversion 16, the synthesized gas mixture is usually passed through a shift conversion step (water-gas reaction) and optionally a subsequent carbon monoxide refining purification.

Figure 18:
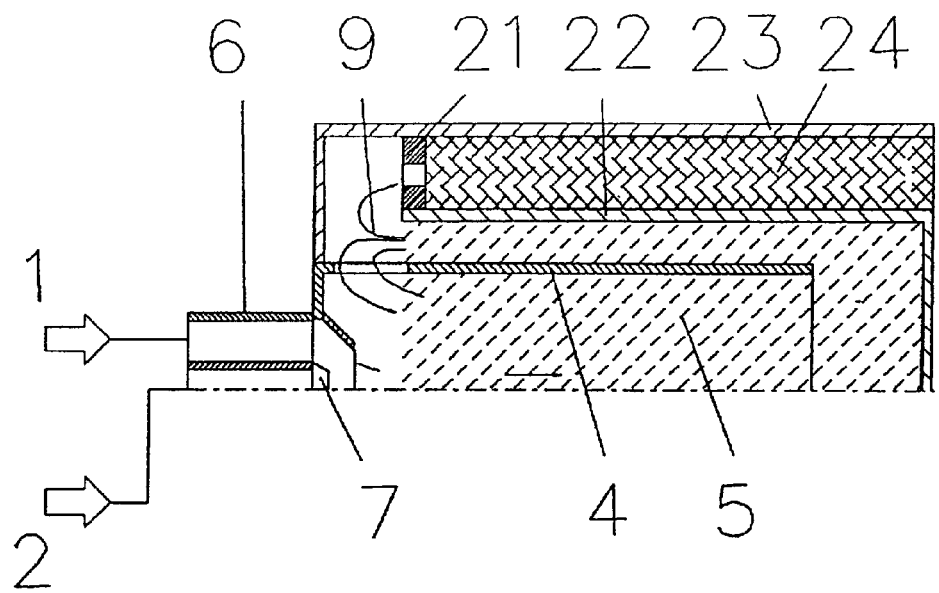
FIG. 18 shows a constructive embodiment of the process according to the invention in an oil burner for firing plants with a thermal power of greater than 1 kW.

In order to prevent backward effects from the zones of high-temperature oxidation, partial or complete oxidation on the cool flame reaction, both reaction spaces are to be separated by fluidic and thermal decoupling. Fluidic decoupling can be effected, for example, by a flashback arrester which prevents backward drifting of the flame root from the high-temperature oxidation by locally increasing the flow rate of the mixture. An embodiment of a flashback arrester 21 is shown in FIG. 18. The thermal decoupling is intended to avoid that the cool flame product should ignite on hot surfaces before entering the high-temperature oxidation. Such hot surfaces can be brought about by thermal conduction from high-temperature oxidation.

By varying the product streams introduced into the process, especially water and oil, the described process sequence can be modified. In a preferred embodiment of step (b) of the process according to the invention, an additional product stream essentially consisting of hydrocarbons or mixtures of hydrocarbons and non-hydrocarbons is supplied to step (b).

Depending on the boundary conditions, it may be more advantageous to initiate the cool flame at a higher air ratio than that required for synthesis gas production. To nonetheless set the required fuel-to-oxidant ratio , the cool flame generator 10 can be provided with a two-step fuel supply (see FIG. 14). In this case, the fuel 1 and oxidant 2 are supplied to the cool flame generator 10 with a higher air ratio at first than that required for the process. The second fuel injection regulates the air ratio required for the process. A positive side effect of the later injection of liquid fuels results from the fact that evaporation heat is withdrawn from the mixture in the reactor, and the temperature of the mixture is thus reduced. A new initiation of the cool flame can be triggered thereby so that further fuel conversion and thus further vaporization of the fuel can occur.

Figure 15:
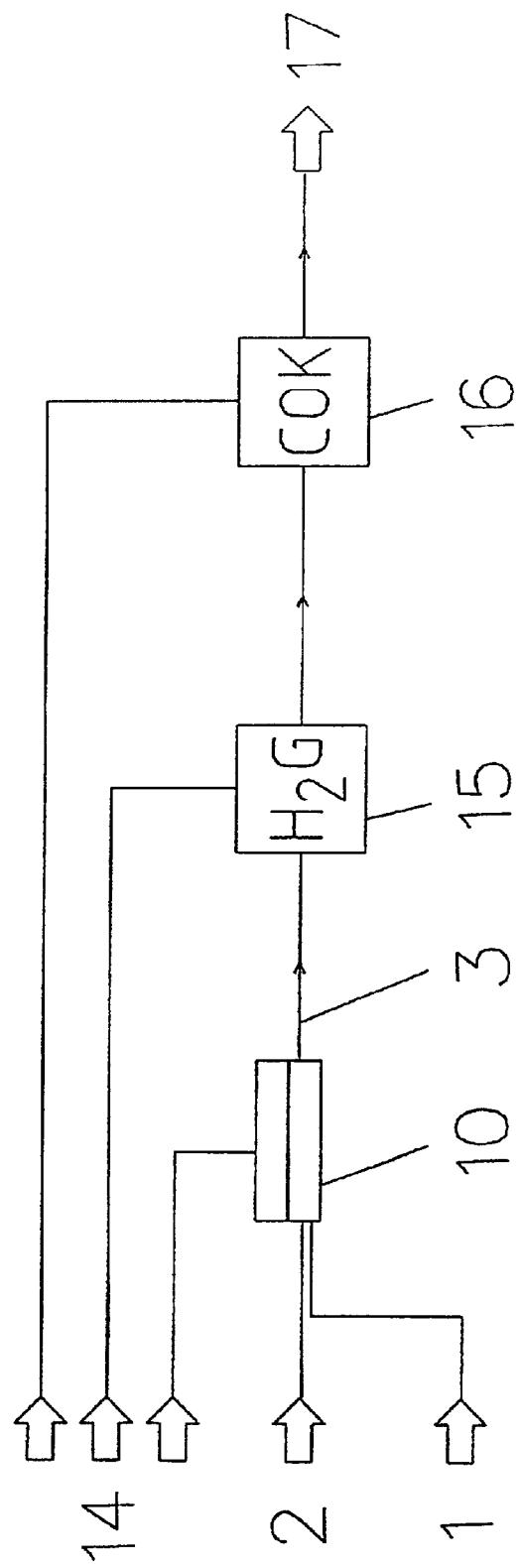
FIG. 15 shows the introduction of water or water vapor into the reaction zone of the cool flame.

Another measure is the introduction of water or water vapor 14 into the reaction zone of the cool flame (see FIG. 15). Water or water vapor are usually employed in substoichiometric reactions for preventing carbon black formation, and in the process according to the invention, they serve at the same time to improve the hydrogen yield. Due to the evaporation heat, the injection of liquid water brings about an additional cooling of the cool flame product, so that an increased fuel conversion in the cool flame can be expected due to the lowering of the starting temperature.

The mixture from step (b) of the process according to the invention can be subjected to an increase in pressure at least partially. Another embodiment of the process according to the invention which includes a later increase of the pressure is considered for use in heat engines.

Figure 16:
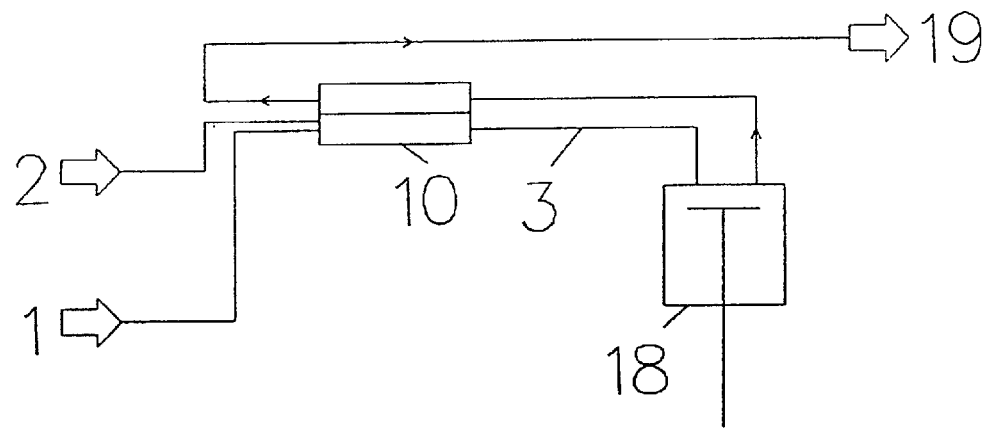
FIG. 16 shows the cool flame generator in combination with a combustion engine.

FIG. 16 shows the cool flame generator shown in FIG. 8 in combination with a combustion engine 18. Here, the process according to the invention serves for generating the mixture for the subsequent combustion engine 18. The fuel 1, preferably a middle distillate, such as diesel fuel, gasoline or the like, and the oxidant 2, preferably air, are supplied to the cold flame generator 10 at a technically useful air ratio. The resulting product gas mixture 3 is compressed in the subsequent combustion engine 18 under Otto engine conditions and subsequently burnt. The exhaust gas 19 leaving the combustion engine 18 serves for preheating the fuel/oxidant mixture in the cool flame generator 10.

An essential advantage of the process according to the invention in combination with a combustion engine is the substantially improved generation of the mixture as compared to conventional Otto and diesel engines, which at the same time results in a reduction of pollutants. For diesel engines, the ULEV standard can be met, in particular, by a reduction of carbon black and NO, levels. In addition, the prevaporization by the cool flame enables the realization of lean-mix engine conceptions, which permits a substantial increase in efficiency with respect to established technologies. Essentially, lean-mix engines are Otto engines which work with substantially higher air ratios (up to $\lambda=4$) as compared to conventional engines having a close to stoichiometric combustion, whereby a strong reduction of $NO_x$ formation is achieved.

Figure 14:
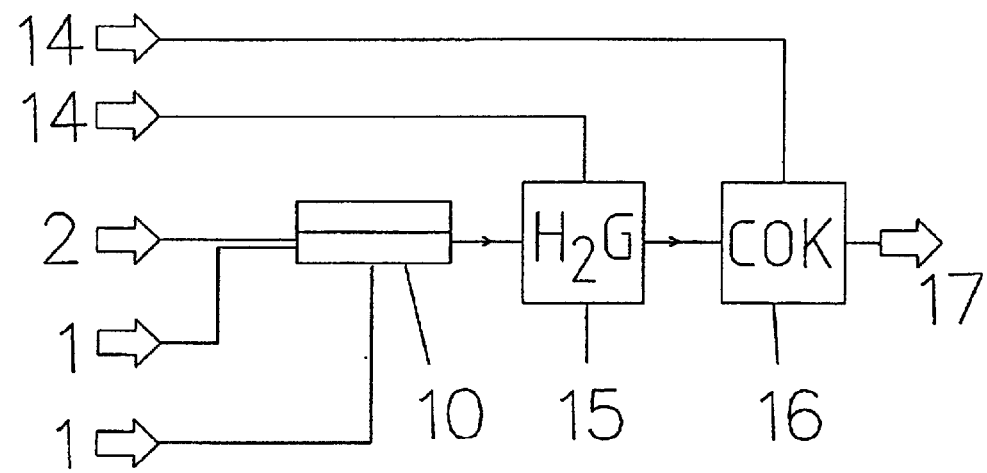
FIG. 14 represents a two-step fuel supply for the cool flame generator.

Examinations made with an experimental setup according to FIG. 14 show that operation in an Otto engine mode is possible with the cool flame product obtained with diesel fuel as the fuel 1. Due to the improved antiknock property of the cool flame product (as compared to carburetor fuels), operation in an Otto engine mode can be performed at substantially higher process pressures. Therefore, a considerable increase in efficiency is to be expected as compared to conventional Otto engine processes, especially in partial load operation.

Figure 17:
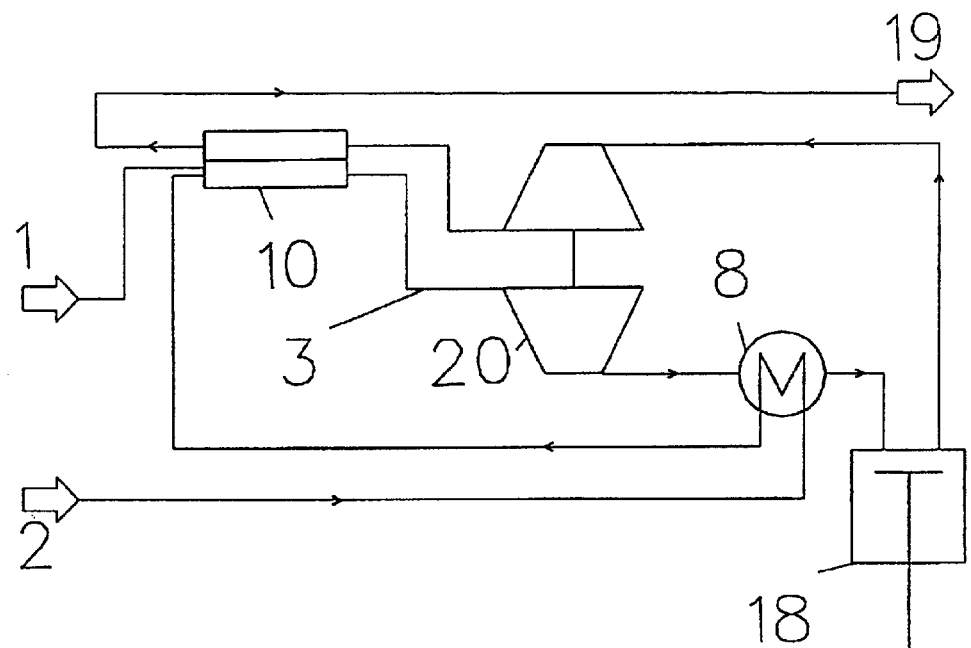
FIG. 17 shows the combustion engine process.

Based on FIG. 16, the combustion engine process in FIG. 17 is optimized with respect to efficiency enhancement. The product mixture 3 leaving the cool flame generator 10 is precompressed, for example, in a conventional turbocharger 20 and cooled in the subsequent oxidant preheater 8 serving as a charging air cooler. The heat flow transferred thereby serves for preheating the air to be employed 2. The measures, i.e., turbocharger in combination with a charging air cooler, essentially improve the volumetric efficiency of the combustion engine 18 and thus its energy conversion efficiency. The term "volumetric efficiency" as used in connection with engines describes the ratio of the volume of the mixture introduced in the cylinder to the actual cylinder working volume, respectively based on atmospheric pressure conditions.

The process according to the invention allows to employ a uniform carburetor for different liquid fuels (e.g., gasoline, kerosine, diesel fuel), whereby a multifuel engine can be realized in a simple way.

Further applications in the field of combustion engineering are possible. The process according to the invention allows the use of liquid fuels in applications which were hitherto limited to gaseous fuels. For example, the cool flame generator can be inserted upstream from a turbine process to produce a homogeneous fuel/combustion air mixture. By the process according to the invention, the ignition delay period of the combustible mixture produced can be adapted to the turbine process.

In a further embodiment of the process according to the invention, the mixture from step (b) can be subjected, at least partially, to a separation process, preferably a thermal separation process.

Figure 19:
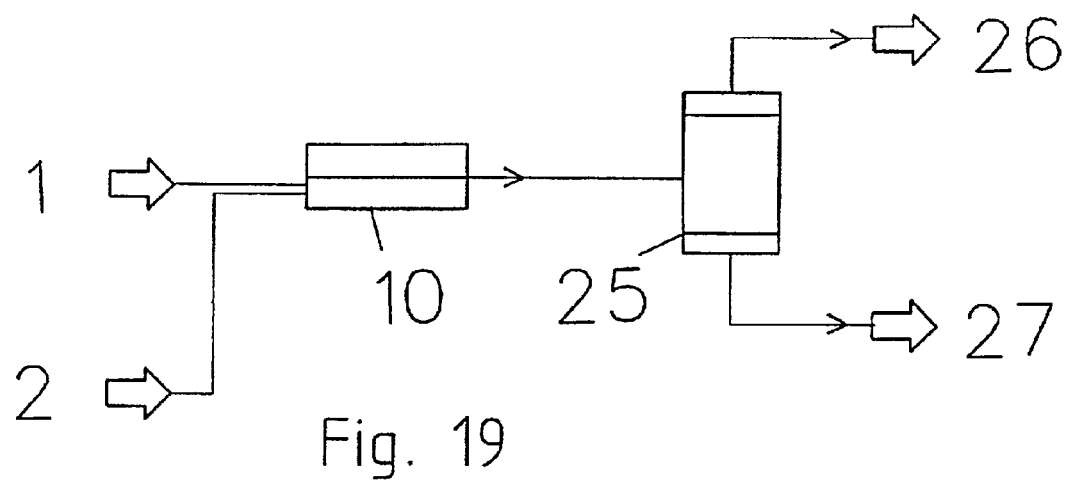
FIG. 19 shows a process for the utilization and separation of matter.

Spectral analyses of the cool flame products 3 both in gaseous and in liquid phase confirm that the process according to the invention provides a utilization of the fuel employed. The products can be selectively influenced as needed by adjusting the state and process parameters, such as temperature control, pressure, quantitative proportion of the starting materials and/or catalytic activity. FIG. 19 shows a process for the utilization and separation of matter. A separator 32 (e.g., phase separation, membrane separation, adsorption, absorption) is provided downstream from the cool flame generator 18. Fields of application for the shown process for the utilization and separation of matter can be found, inter alia, in refining plant applications (synthesis of unsaturated hydrocarbons, such as alkenes; partial oxidation of hydrocarbons to form ketones, aldehydes or carboxylic acids; separation of undesirable petroleum fractions, such as nitrogen, chlorine, fluorine and/or sulfur compounds and the like) or in the preparation of synthesis gas for the separation of undesirable components (sulfur separation in the preparation of fuel gas for fuel cells). In principle, it is possible to subject crude oil fractions to a first treatment by the process according to the invention.

The process according to the invention yields a novel product which can be obtained by any of the process steps described above.

FIG. 18 shows a constructive embodiment of the process according to the invention in an oil burner for firing plants with a thermal power of preferably greater than 1 kW (sectional drawing). The core component of the burner shown is the cool flame generator known from FIG. 8. The reaction zone of the cool flame 5 forms in the entire zone of the reaction tube 4 and the annular gap formed by the burner tube 22 and the reaction tube 4. The whole system is enclosed by a jacket tube 23. In the annular gap formed between the jacket tube 23 and the burner tube 22, the product gas 3 is burnt. According to the preheating principle shown in FIG. 12, the heat required for initiating the cool flames is withdrawn from the combustion zone 24, which is designed as a porous body or hollow space, and introduced into the process zone of cool flames 5 through the burner tube wall 22. To lower the starting temperature, the external recirculation 9 of the cool flame products 3 shown in FIG. 9b) is constructively embodied. The flame retention baffle represented as 21 serves as a flashback arrester.

REFERENCES

Affens, R. S.; Sheinson, W. A.: Autoignition; The Importance of the Cool Flame in the Two-Stage Process. Naval Research Laboratory, Washington D.C. In: Loss Prevention, American Institute of Chemical Engineers, 1979 (Volume 13), p. 83–88.

Brand, R.; Schilling, J.; Müller, W.: Experimentalstudie zur Entwicklung eines neuen Haushaltsölbrenners, Bundesministerium für Forschung und Technik (BMFT), Forschungsbericht T 81-006, 1981.

Coffee, R. D.: Cool Flames and Autoignition: Two Oxidation Processes. In: Loss Prevention, American Institute of Chemical Engineers, 1979 (Volume 13), p. 74–82.

Freytag, H. H.: Handbuch der Raumexplosionen. Verlag Chemie GmbH, Weinheim, 1965.

Kostka, H.; Michel, A.: Regelbarer Vergasungsbrenner kleiner Leistung, Bundesministerium für Forschung und Technik (BMFT), Forschungsbericht T 82-038, 1982.

Lefebvre, A.; Freeman, W.; Cowell, L.: Spontaneous ignition delay characteristics of hydrocarbon fuel/air mixtures, NASA Contractor Report 175064, 1986.

Mallog, J.; Eisfeld, F.; Universität Kaiserslautern, Lehrstuhl für Kraft- und Arbeitsmaschinen im Fachbereich Maschinenwesen: Auslegung von regelbaren Verdampfungsbrennern für Hausheizungen kleinerer Leistung mit hoher Energieausnutzung. Eggenstein: Fachinformationszentrum Energie, Physik, Mathematik GmbH, 1983 (BMFT-FB-T 83-229)—Forschungsbericht im Auftrag des Bundesministeriums für Forschung und Technik.

Pitsch, H.; Müller, U. C.; Peters, N.: Modellierung des Zundvorgangs am Einspritzstrahl bei dieselmotorischer Verbrennung, In: VDI Berichte Nr. 1193, 1995, p. 533–540.

Schilling, S.: Aerosolbrenner mit reaktivem Flammenhalter als Flächenbrenner für Kleinstleistungen. In: Brennpunkt (1997), Nr. 34, Issue 11, p. 3–5.

Spadaccini, L. J.; TeVelde, J. A.: Autoignition characteristics of aircrafttype fuels, In: Combustion and Flame 46, 1982, p. 283–300.

Stoffel, B.; Reh, L.: Conversion of liquid to gaseous fuels for lean premixed combustion. International Gas Turbine and Aeroengine Congress and Exposition, Houston, Tex., 1995.

Warnatz, J.; Maas, U.: Technische Verbrennung, Springer Verlag, Berlin, 1993, ISBN 3-540-56183-8, p. 104 ff.

Zabetakis, M. G.; Furno, A. L.; Jones, G. W.: Minimum spontaneous ignition temperatures of combustibles in air. In: Ind. & Eng. Chem. (1954) No. 46, p. 2173–2178.

What is claimed is:

1. A process for the utilization of a fuel having an initial boiling temperature or prevailing initial boiling temperature range at 1 bar of between 231–830° K, characterized in that:

(a) the fuel is contacted with at least one oxidant preheated to from at a pressure, p, of $\geq 1$ bar or at a lower pressure with a reduction of the temperature range, and a C/O molar ratio of between 1:0.14 and 1:25 in a reaction chamber to initiate exothermic prereactions in the form of a cool flame which cause only partial conversion of the fuel and oxidant even when the fuel and oxidant are homogeneously mixed; and (b) a kinetic reaction inhibition of the further reaction of the oxidizable mixture formed in the cool flame is provided by adjusting the technically relevant residence time $t_v$ of the mixture prepared in step (a) in the reaction chamber of $t_v > 25$ ms at $p \leq 1$ bar, and residence times which become shorter when the pressure is increased under otherwise equal conditions, and a limited heat dissipation from the reaction zone through an inert gas stream with a ratio of the heat capacity flow of the oxidant, $\dot{M} \cdot c_p$, to the product of fuel mass flow, $\dot{M}_b$, and heating value, $H_u$, which is, in the adiabatic reaction space, $\dot{M} \cdot c_p / \dot{M}_b \cdot H_u > 2 \cdot 10^{-4}$ K$^{-1}$ and/or through the reactor wall with a heat flow density, $\dot{q}$, of $\dot{q} < 85$ kW/m$^2$, whereby auto-ignition of the mixture is prevented, especially for a predictable period of time.

2. The process according to claim 1, wherein said fuel is selected from hydrocarbons and mixtures of hydrocarbons with non-hydrocarbons in the form of emulsions and/or suspensions with liquids substantially insoluble in hydrocarbon, especially water in admixture with ammonia, hydrogen sulfide and/or alkanols.

3. The process according to claim 2, wherein said oxidant is oxygen, ozone, air, exhaust gases from superstoichiometric combustion, an oxygen-containing compound, such as a compound containing peroxides, sulfur oxides, nitrogen oxides ($N_yO$ or $NO_x$).

4. The process according to claim 1, further characterization in that at least partial vaporation of the product from step (b) is achieved by cooling.

5. The process according to claim 1, wherein the mixture from step (b) is further at least partially recirculated into a system of step (a).

6. The process according to claim 1, wherein the starting temperature of the exothermic prereactions is lowered by a pressure reduction of the mixture of oxidant and fuel, by recirculation of at least part of the mixture of step (b), and/or by the addition of a catalyst.

7. The process according to claim 6, wherein the energy necessary for initiating the reactions of step (a) is obtained from the exothermic prereaction according to step (a) and/or by introducing energy from a downstream process.

8. The process according to claim 1, wherein the mixture of step (b) will condense at a lower temperature range than that corresponding to the initial boiling temperature range of the fuel.

9. The process according to claim 1 utilized for the processing and/or refining of fuels, especially in refining plants, in synthesis gas production, protective gas production, for the provision of gaseous fuels for fuel cells, for combustion in combustion engines and/or firing plants, for the separation of product streams from accompanying substances.

10. The process according to claim 1 for providing of at least partially vaporized fuels for driving mobile devices, such as vehicles.

11. The process according to claim 1 for providing of at least partially vaporized fuels for use in immobile devices, such as devices for the generation of mechanical or electric power and/or heat.

12. The process according to claim 10, wherein air and/or oxygen is preferably used as the oxidant, and the educts from step (a) are supplied substoichiometrically, preferably at an air ratio of $\lambda = 0.2$ to 0.7.

13. The process according to claim 2, wherein an additional product stream essentially consisting of said fuels or non-hydrocarbons, especially materials containing water, is supplied to step (b).

14. The process for the processing and/or refining of fuels according to claim 9, wherein the product obtained from step (b) is converted to a fuel gas suitable for fuel cells, such as hydrogen, carbon monoxide and/or short-chained hydrocarbons, by technically known process steps, preferably partial oxidation, steam reforming and/or shift conversion (water-gas reaction).

15. The process according to claim 9, wherein said fuel cell is a membrane fuel cell (PEMFC).

16. The process according to claim 9, wherein the mixture from step (b) is subjected, at least partially, to an increase in pressure.

17. The process according to claim 1, wherein the mixture from step (b) is further subjected, at least partially, to a separation process, preferably a thermal separation process.

* * * * *

UNITED STATES PATENT AND TRADEMARK OFFICE
CERTIFICATE OF CORRECTION

| | | |
|---|---|---|
| PATENT NO. | : 6,793,693 B1 | Page 1 of 1 |
| APPLICATION NO. | : 09/744752 | |
| DATED | : September 21, 2005 | |
| INVENTOR(S) | : Koehne et al. | |

It is certified that error appears in the above-identified patent and that said Letters Patent is hereby corrected as shown below:

Column 15, line 29, change "231-830 °K" to read --231 K and 830 K--.

Column 15, line 31, change "from at" to read --from 520 K to 880 K at--.

Column 15, line 33, change "ratio of" to read --ratio of the mixture of fuel and oxidant of--.

Column 16, line 37, change claim reference "10" to read --9--.

Signed and Sealed this

Fifth Day of February, 2008

JON W. DUDAS
*Director of the United States Patent and Trademark Office*

UNITED STATES PATENT AND TRADEMARK OFFICE
CERTIFICATE OF CORRECTION

PATENT NO. : 6,793,693 B1  Page 1 of 1
APPLICATION NO. : 09/744752
DATED : September 21, 2004
INVENTOR(S) : Koehne et al.

It is certified that error appears in the above-identified patent and that said Letters Patent is hereby corrected as shown below:

Column 15, line 29, change "231-830 °K" to read --231 K and 830 K--.

Column 15, line 31, change "from at" to read --from 520 K to 880 K at--.

Column 15, line 33, change "ratio of" to read --ratio of the mixture of fuel and oxidant of--.

Column 16, line 37, change claim reference "10" to read --9--.

This certificate supersedes the Certificate of Correction issued February 5, 2008.

Signed and Sealed this

Twenty-sixth Day of February, 2008

JON W. DUDAS
*Director of the United States Patent and Trademark Office*